(12) United States Patent
Onomichi et al.

(10) Patent No.: US 8,973,869 B2
(45) Date of Patent: Mar. 10, 2015

(54) LANDING GEAR RETRACTION/EXTENSION DEVICE OF AIRCRAFT

(75) Inventors: Yasuto Onomichi, Hyogo (JP); Taku Kondo, Hyogo (JP); Shogo Hagihara, Hyogo (JP); Ryo Takaki, Hyogo (JP); Takaaki Onishi, Hyogo (JP)

(73) Assignee: Sumitomo Precision Products Co., Ltd., Hyogo (JP)

( * ) Notice: Subject to any disclaimer, the term of this patent is extended or adjusted under 35 U.S.C. 154(b) by 197 days.

(21) Appl. No.: 13/618,540

(22) Filed: Sep. 14, 2012

(65) Prior Publication Data

US 2013/0068885 A1 Mar. 21, 2013

(30) Foreign Application Priority Data

Sep. 15, 2011 (JP) ................................ 2011-201741

(51) Int. Cl.
*B64C 25/22* (2006.01)
*F15B 21/04* (2006.01)
*F15B 7/00* (2006.01)
*B64C 13/50* (2006.01)
*F15B 1/26* (2006.01)

(52) U.S. Cl.
CPC .............. *B64C 25/22* (2013.01); *F15B 7/006* (2013.01); *F15B 21/042* (2013.01); *B64C 2013/506* (2013.01); *F15B 2211/20515* (2013.01); *F15B 2211/20538* (2013.01); *F15B 2211/20561* (2013.01); *F15B 2211/27* (2013.01); *F15B 2211/3058* (2013.01); *F15B 2211/411* (2013.01); *F15B 2211/4159* (2013.01); *F15B 2211/8752* (2013.01); *F15B 1/26* (2013.01); *F15B 2211/6343* (2013.01); *F15B 2211/6651* (2013.01)

USPC .................... 244/102 R; 244/102 A; 244/99.2

(58) Field of Classification Search
USPC ......... 244/100 R, 102 R, 102 A, 103 R, 99.2, 244/99.4–99.6
See application file for complete search history.

(56) References Cited

U.S. PATENT DOCUMENTS

| | | | | |
|---|---|---|---|---|
| 3,762,670 A | * | 10/1973 | Chillson | 244/50 |
| 5,109,672 A | * | 5/1992 | Chenoweth et al. | 60/456 |
| 6,397,590 B1 | * | 6/2002 | Hart | 60/329 |
| 8,430,354 B2 | * | 4/2013 | Fervel et al. | 244/75.1 |
| 8,556,209 B2 | * | 10/2013 | Luce | 244/102 SS |

(Continued)

FOREIGN PATENT DOCUMENTS

| | | |
|---|---|---|
| EP | 2322808 A2 | 5/2011 |
| JP | 2000-14114 A | 1/2000 |
| JP | 2002-161966 A | 6/2002 |

(Continued)

OTHER PUBLICATIONS

European Patent Office, Extended European Search Report for Application No. 12184275.1, Oct. 10, 2014, 7 pages, Germany.

*Primary Examiner* — Timothy D Collins
*Assistant Examiner* — Jamie S Stehle
(74) *Attorney, Agent, or Firm* — Alston & Bird LLP

(57) ABSTRACT

A landing gear retraction/extension device includes a hydraulic actuator, a hydraulic circuit, a hydraulic pump, an electric motor, and a driver. Part of the hydraulic circuit is provided such that heat is exchangeable between operation oil and each of the electric motor and the driver. The driver supplies power to the electric motor before landing of an aircraft such that an operation oil temperature is higher than a predetermined temperature upon the landing of the aircraft.

5 Claims, 3 Drawing Sheets

(56) References Cited

U.S. PATENT DOCUMENTS

2005/0082427 A1* 4/2005 Seung ................ 244/102 R
2006/0150621 A1* 7/2006 Nakata et al. ............ 60/337

FOREIGN PATENT DOCUMENTS

| JP | 2003-339101 A | 11/2003 |
| JP | 2004-162860 A | 6/2004 |
| JP | 2005-348535 A | 12/2005 |
| JP | 2008-273361 A | 11/2008 |
| JP | 2009-228792 A | 10/2009 |

* cited by examiner

LANDING GEAR RETRACTION/EXTENSION DEVICE OF AIRCRAFT

CROSS-REFERENCE TO RELATED APPLICATION

This application claims priority to Japanese Patent Application No. 2011-201741 filed on Sep. 15, 2011, the disclosure of which including the specification, the drawings, and the claims are hereby incorporated by reference in its entirety.

BACKGROUND

A technique disclosed herein relates to a landing gear retraction/extension device of an aircraft including an electro hydrostatic actuator (EHA) system.

In a technical field of automobiles, a technique has been known, in which various oil temperatures are maintained at equal to or higher than a predetermined temperature during traveling of a vehicle, and therefore oil viscosity is maintained at equal to or less than a predetermined value.

For example, Japanese Patent Publication No. 2008-273361 describes an electric hydraulic power steering device including an electric motor and a hydraulic pump driven by the electric motor. In the electric hydraulic power steering device, operation oil is heated by using heat from the electric motor, and the temperature of the operation oil is maintained at a predetermined temperature. In addition, in the electric hydraulic power steering device, when an operation oil temperature of equal to or lower than the predetermined temperature, and the power steering device is not substantially operated because steering force caused by steering device is equal to or less than a required force, current which is not capable of rotating the electric motor is applied to the electric motor to generate heat, thereby heating operation oil.

Japanese Patent Publication No. 2005-348535, Japanese Patent Publication No. 2002-161966, and Japanese Patent Publication No. 2003-339101 each describe a hybrid electric vehicle (HEV) including an engine and a drive motor or an electric vehicle (EV) including a drive motor. In the HEV or the EV, cooling oil and/or automatic transmission fluid and/or lubrication oil for a differential gear is maintained at a predetermined temperature during traveling of the vehicle by using liberated heat energy by driving motor.

Japanese Patent Publication No. 2000-014114 describes a disk device for, e.g., CDs and DVDs, and the disk device includes a motor having an oil-containing bearing. In the disk device, upon low-temperature start-up, current is supplied to a coil of the motor to generate heat in the coil, and then lubrication oil of the bearing is heated. In such a manner, it is ensured that the motor is started in a short time.

Japanese Patent Publication No. 2004-162860 describes a hydraulic drive device such as machine tools. In the hydraulic drive device, when an operation oil temperature is equal to or lower than a predetermined value upon start-up of the hydraulic drive device, current which has a non-optimal phase for driving motor is supplied to an electric motor to increase the amount of heat generation at an electric coil. In such a manner, the operation oil temperature is quickly increased.

SUMMARY

In recent years, it has been proposed considering, e.g., improvement of fuel consumption of an aircraft and maintenance of an aircraft that an EHA system is mounted as an actuator for, e.g., retraction/extension of a landing gear, a control surface operation, a braking operation, and a landing gear steering operation, instead of employing a hydraulic supply system mounted in a conventional aircraft (see, e.g., Japanese Patent Publication No. 2009-228792). The EHA system includes, e.g., a hydraulic linear actuator having a cylinder and a piston, a hydraulic pump, and an electric motor. The electric motor and the hydraulic pump are driven to operate the hydraulic linear actuator without a supply of oil pressure from outside power source. For example, in a landing gear retraction/extension device, the EHA system can be employed for at least one of an actuator for retracting/extending a landing gear, an actuator for opening/closing a landing gear door, and an actuator (down-lock release actuator) for releasing a mechanism for maintaining a landing gear extension state.

However, an aircraft is exposed to an extremely low temperature during flight at a high altitude. Thus, if the EHA system is mounted at outside of temperature control zone (e.g., a gear bay) in the aircraft, the EHA system is exposed to the extremely low temperature. In the conventional aircraft, since the hydraulic supply system of the conventional aircraft is constantly used during the flight, oil is still warm and does not enter a low-temperature state. On the other hand, the landing gear retraction/extension device is particularly used only upon takeoff and landing of the aircraft, and is not much used during the flight. Thus, the operation oil temperature of the EHA system for the landing gear retraction/extension device is dropped during the flight. As a result, there is a possibility that the oil temperature is dropped to equal to or lower than a lower temperature limit at which the viscosity of operation oil is significantly increased and/or operation oil shrinkage occurs. In particular, the drop in operation oil temperature provides an adverse impact on an operation of the EHA system upon the landing, and there is a possibility to reduce reliability and safety of the landing gear retraction/extension device.

As described in the foregoing documents, waste heat from various devices may be, during the flight of the aircraft, used to maintain the operation oil temperature at a temperature higher than the lower temperature limit. However, since the landing gear retraction/extension device is not used during the flight as described above, the constant maintenance of the operation oil temperature at the foregoing temperature during the flight is disadvantageous to improvement of fuel consumption of the aircraft.

On the other hand, if the drop in operation oil temperature is accepted for the landing gear retraction/extension device, it is necessary to employ, e.g., the following configurations: the configuration in which a pressure type reservoir is employed for a hydraulic circuit in order to compensate for a pressure loss in a pipe or the hydraulic pump due to the increase in viscosity; and the configuration in which a reservoir capacity is increased considering the operation oil shrinkage. However, such configurations result in an increase in weight of the landing gear retraction/extension device, and the weight increase is disadvantageous to the improvement of the fuel consumption of the aircraft.

The technique disclosed herein has been made in view of the foregoing, and it is an objective of the present disclosure to allow, in a landing gear retraction/extension device of an aircraft including an EHA system, temperature management of operation oil without increasing the weight of the landing gear retraction/extension device.

The present disclosure discloses a landing gear retraction/extension device for retracting/extending a landing gear of an aircraft. The landing gear retraction/extension device includes a hydraulic actuator; a hydraulic circuit which is capable of supplying operation oil to the hydraulic actuator to operate the hydraulic actuator; a hydraulic pump arranged on the hydraulic circuit and driven to supply operation oil to the hydraulic actuator; an electric motor configured to drive the hydraulic pump; and a driver configured to drive the electric motor. Part of the hydraulic circuit is configured such that heat is exchangeable between operation oil and each of the electric motor and the driver. The definition of "part of the hydraulic circuit is configured such that heat is exchangeable between operation oil and each of the electric motor and the driver" may be as follows: heat released from the electric motor and the driver is transferred to operation oil to heat the operation oil, and, as a result, the temperature of the operation oil is increased.

According to the foregoing configuration, in the landing gear retraction/extension device, the electric motor is driven to drive the hydraulic pump. In association with the driving of the hydraulic pump, operation oil is supplied to the hydraulic actuator through the hydraulic circuit, thereby operating the hydraulic actuator. That is, the landing gear retraction/extension device includes an EHA system. The hydraulic actuator may be, e.g., a hydraulic linear actuator including a cylinder and a piston. In such a case, in the landing gear retraction/extension device for retracting/extending the landing gear, the hydraulic actuator may be employed as at least one of the followings: an actuator for retracting/extending a landing gear, an actuator for opening/closing a door of a landing gear accommodation part provided in an aircraft body, and an actuator (down-lock release actuator) for releasing a mechanism for maintaining a landing gear extension state.

Part of the hydraulic circuit is arranged such that heat is exchangeable between operation oil and each of the electric motor and the driver configured to drive the electric motor. In such a manner, not only heat from electric motor generated in association with a power supply to the electric motor but also heat from the driver driven to supply power to the electric motor are transferred to operation oil in the hydraulic circuit, thereby heating the operation oil. As a result, it is ensured that operation oil having a temperature dropped to a predetermined temperature (e.g., a temperature equal to or lower than a lower temperature limit) during flight at a high altitude can be promptly increased to a temperature higher than the lower temperature limit. This allows relatively-low viscosity of operation oil and reduction in operation oil shrinkage. Consequently, the hydraulic actuator of the EHA system is stably operated, and reliability of the landing gear retraction/extension device is ensured.

In the foregoing configuration, since not only waste heat from the electric motor of the EHA system but also waste heat from the driver configured to drive the electric motor are used, the operation oil temperature can be efficiently and promptly increased with low energy consumption. This is advantageous to improvement of fuel consumption of the aircraft.

An additional device such as a heater is not required for increasing the operation oil temperature. This avoids an increase in weight of the landing gear retraction/extension device, and is also advantageous to the improvement of the fuel consumption of the aircraft. Since the operation oil temperature can be optimized, it is not necessary to employ a pressure type reservoir considering an increase in viscosity of operation oil or to increase a reservoir capacity considering the operation oil shrinkage. This also allows reduction in weight of the landing gear retraction/extension device.

The driver may supply power to the electric motor right before landing of the aircraft such that a temperature of operation oil is higher than a predetermined temperature upon the landing of the aircraft upon which the hydraulic actuator of EHA system is operated.

In the foregoing manner, power is supplied to the electric motor by the driver before the landing of the aircraft, thereby heating operation oil. Thus, upon the landing of the aircraft upon which the hydraulic actuator is actually in operation, the operation oil temperature is higher than the predetermined temperature (e.g., a lower temperature limit), and it is ensured that the EHA system can be operated. As a result, the hydraulic actuator of the EHA system can be operated safely, and therefore the reliability of the landing gear retraction/extension device is ensured.

In the foregoing configuration, the operation oil temperature is not constantly maintained at the temperature higher than the predetermined temperature during the flight of the aircraft, but is increased right before the landing of the aircraft. This is advantageous to the improvement of the fuel consumption of the aircraft. As described above, since waste heat from both of the electric motor and the driver is used, a time required to increase the operation oil temperature is shortened, and the increase in operation oil temperature is completed in a short time before the landing of the aircraft.

When power is supplied to the electric motor before the landing of the aircraft, power may be, in order not to operate the hydraulic actuator, supplied such that the electric motor does not rotate, or may be supplied such that a torque of the electric motor is equal to or less than a drive torque of the hydraulic pump. In such a case, since the hydraulic pump is not driven, the operation oil temperature is increased in the state in which operation oil does not circulate in the hydraulic circuit. As another alternative, in the state in which operation oil circulates in the hydraulic circuit with the hydraulic actuator being bypassed, power may be supplied to the electric motor such that the hydraulic pump is driven. In such a case, while operation oil circulates in the hydraulic circuit, the operation oil temperature is increased by waste heat from the electric motor and the driver.

Upon the landing of the aircraft, if the operation oil temperature is already higher than the predetermined temperature, the power supply to the electric motor for increasing the operation oil temperature may be stopped.

DETAILED DESCRIPTION

Figure 1:
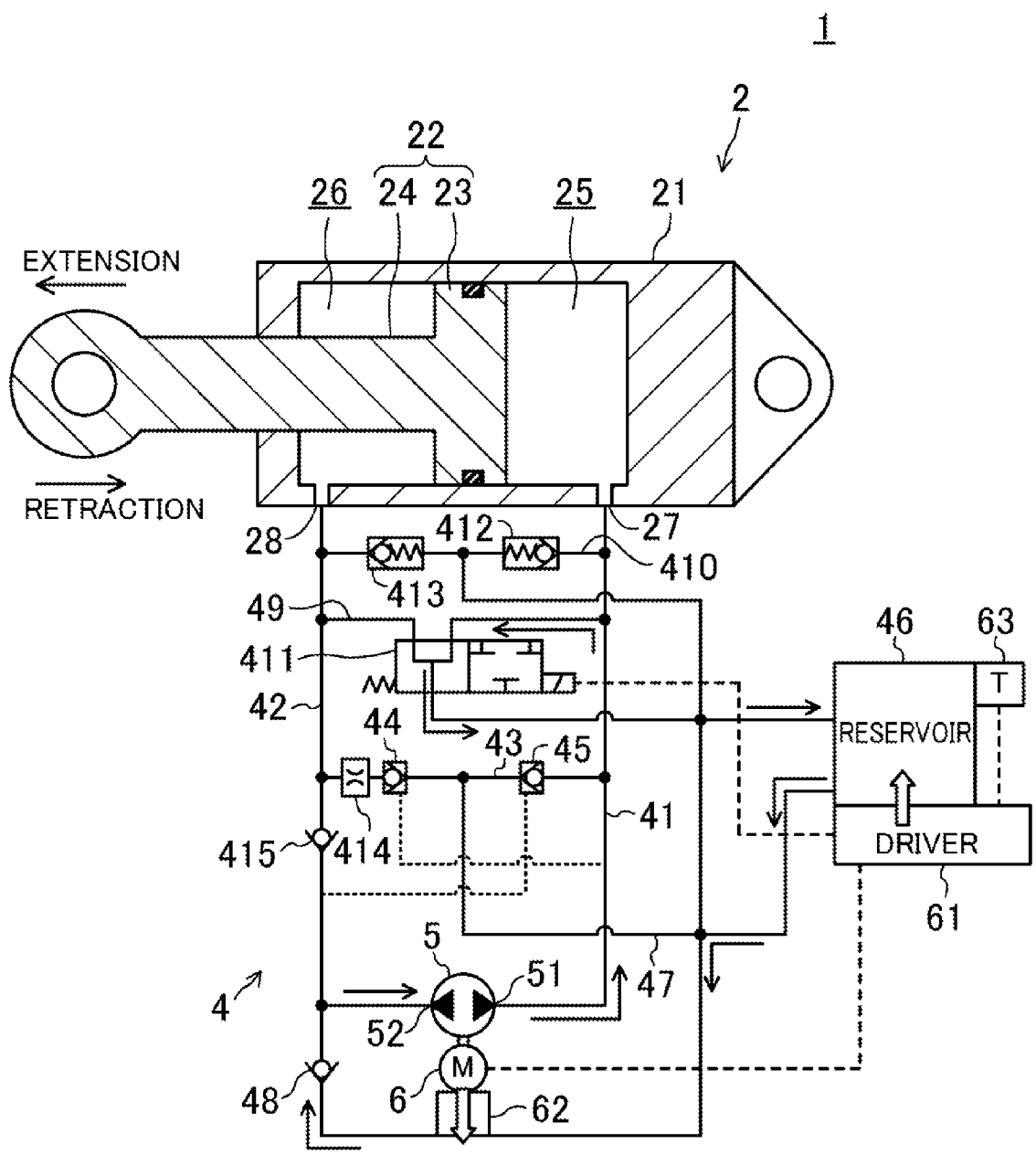
FIG. 1 is a circuit diagram illustrating a configuration of an EHA system of a landing gear retraction/extension device.

An embodiment of a landing gear retraction/extension device of an aircraft will be described below with reference to drawings. The embodiment will be set forth merely for the purpose of a preferred example in nature. FIG. 1 illustrates a configuration of an EHA system 1 provided in the landing gear retraction/extension device. The EHA system 1 includes a hydraulic actuator 2 and a hydraulic circuit 4.

The hydraulic actuator 2 includes a cylinder 21 and a piston 22. The hydraulic actuator 2 is an extendable linear actuator which is extendable/retractable by a supply of operation oil as will be described later. The piston 22 includes a piston head 23 accommodated and reciprocating in the cylinder 21, and a piston rod 24 integrally connected to the piston head 23 and arranged so as to protrude from the cylinder 21. Although not shown in the figure, the hydraulic actuator 2 is, in the landing gear retraction/extension device, employed as any of an actuator for retracting/extending a landing gear, an actuator for opening/closing a landing gear door, and an actuator (down-lock release actuator) for releasing a mechanism for maintaining a landing gear extension state.

An inside of the cylinder 21 of the hydraulic actuator 2 is divided into a first chamber 25 on a side closer to a head relative to the piston head 23 and a second chamber 26 on a side closer to a rod relative to the piston head 23. A port (i.e., a first port 27 and a second port 28) through which operation oil flows in/out is formed in each of the first chamber 25 and the second chamber 26.

The hydraulic circuit 4 is a closed circuit provided between the hydraulic actuator 2 and a hydraulic pump 5. The hydraulic circuit 4 includes a first passage/pipe 41 connecting the first port 27 of the hydraulic actuator 2 and a first port 51 of the hydraulic pump 5 together, and a second passage/pipe 42 connecting the second port 28 of the hydraulic actuator 2 and a second port 52 of the hydraulic pump 5 together.

The hydraulic circuit 4 further includes a first pilot check valve 44 and a second pilot check valve 45 arranged on a third passage/pipe 43 connecting the first passage/pipe 41 and the second passage/pipe 42 together. The first pilot check valve 44 uses the first passage/pipe 41 as a pilot line, and the second pilot check valve 45 uses the second passage/pipe 42 as a pilot line. The third passage/pipe 43 is, at part thereof between the first pilot check valve 44 and the second pilot check valve 45, connected to a reservoir 46 through a pipe 47. The reservoir 46 is a tank for absorbing a fluctuation in the total capacity of the first chamber 25 and the second chamber 26 of the hydraulic actuator 2, and is connected to the second passage/pipe 42 (i.e., the second port 52 of the hydraulic pump 5) through a check valve 48.

The hydraulic pump 5 is a pump which includes the first and second ports 51, 52 and which is capable of controlling the first port 51 and the second port 52 such that an output direction of operation oil and an input direction of operation oil are switched. Although not specifically shown in the figure, the hydraulic pump 5 is, e.g., a swash plate type piston pump. Note that the type of the hydraulic pump 5 is not limited to the foregoing.

An electric motor 6, e.g., a three-phase motor, is connected to the hydraulic pump 5, and is driven to drive the hydraulic pump 5. Electric power is supplied to the electric motor 6 by a driver (including a controller which is capable of controlling various devices) 61, thereby driving the electric motor 6 (see a dashed line in FIG. 1). The switching of the output direction of operation oil from the hydraulic pump 5 and the input direction of operation oil into the hydraulic pump 5 may be performed by reversing the rotation direction of the electric motor 6, or may be performed by changing the inclination angle of the swash plate of the swash plate type piston pump (i.e., the hydraulic pump 5).

A fourth passage/pipe 49 and a fifth passage/pipe 410 are further provided in parallel between the first passage/pipe 41 and the second passage/pipe 42. A solenoid valve 411 controlled by the driver 61 is arranged on the fourth passage/pipe 49, and a first relief valve 412 and a second relief valve 413 each opened at equal to or higher than a predetermined pressure are arranged on the fifth passage/pipe 410. The fifth passage/pipe 410 is, at part thereof between the first relief valve 412 and the second relief valve 413, connected to the reservoir 46.

The solenoid valve 411 is a three-port two-way switching valve including a port communicating with the first passage/pipe 41, i.e., with the first chamber 25 of the hydraulic actuator 2, a port communicating with the second passage/pipe 42, i.e., with the second chamber 26 of the hydraulic actuator 2, and a port communicating with the reservoir 46. The solenoid valve 411 is switchable between a first state in which the first chamber 25 and the second chamber 26 of the hydraulic actuator 2 and the reservoir 46 do not communicate with each other and a second state (state illustrated in FIG. 1) in which the first chamber 25, the second chamber 26, and the reservoir 46 communicate with each other. In such a manner that the solenoid valve 411 is in the first state (energized position) in normal operation and is, on the other hand, in the second state (unenergized position) upon fail, the hydraulic actuator 2 can be extended even if the hydraulic pump 5 is not operated.

Although details will be described later, when waste heat from the electric motor 6 and the driver 61 is, before landing of the aircraft, used to increase an operation oil temperature, the solenoid valve 411 is switched to the second state by output of the driver 61. This allows operation oil to circulate in the hydraulic circuit 4 with the hydraulic actuator 2 being bypassed.

An orifice (flow restrictor) 414 configured to adjust a flow rate from first chamber 25 to the reservoir 46 is arranged on the third passage/pipe 43 on a side closer to the first pilot check valve 44, and a check valve 415 is arranged on the second passage/pipe 42 on a side closer to the hydraulic pump 5 relative to a connection part of the second passage/pipe 42 and the third passage/pipe 43. The check valve 415 is a valve configured to hold the hydraulic actuator 2 at a middle position between an extended position and a retracted position in a non-operation condition of hydraulic pump and motor.

A basic operation of the EHA system 1 configured as described above is as follows. That is, in order to extend the hydraulic actuator 2, the electric motor 6 is driven by the driver 61 with the solenoid valve 411 of the hydraulic circuit 4 being switched to the first state, and then the hydraulic pump 5 is driven such that operation oil is discharged through the first port 51. This allows the operation oil to be supplied to the first chamber 25 through the first passage/pipe 41 and the first port 27, and the piston 22 moves to the left as viewed in FIG. 1. As a result, the hydraulic actuator 2 is extended.

The first pilot check valve 44 opens in association with the supply of the operation oil through the pilot line of the first passage/pipe 41. In a return flow from the second chamber 26 by the movement of the piston 22, the operation oil flows into the reservoir 46 via the second passage/pipe 42, the orifice 414, the first pilot check valve 44 and the third passage/pipe 43. Then, the operation oil flows from the reservoir 46 to the second port 52 of the pump 5 via the check valve 48. Meanwhile, in order to compensate for a fluctuation between the first chamber 25 and the second chamber 26, the hydraulic pump 5 is refilled with operation oil supplied from the reservoir 46 to the hydraulic pump 5 through the check valve 48 and the second port 52.

Conversely, in order to retract the hydraulic actuator 2, the electric motor 6 is driven with the solenoid valve 411 being switched to the first state, and then the hydraulic pump 5 is driven such that operation oil is discharged through the second port 52. This allows the operation oil to be supplied to the second chamber 26 through the second passage/pipe 42 and the second port 28, and the piston 22 moves to the right as viewed in FIG. 1. As a result, the hydraulic actuator 2 is retracted.

The second pilot check valve 45 opens in association with the supply of the operation oil through the pilot line of the second pipe 42. In a return flow from the first chamber 25 by the movement of the piston 22, part of the operation oil flows into the first port 51 of the hydraulic pump 5 via the first passage/pipe 41, and the rest of the operation oil flows into the reservoir 46 via the first passage/pipe 41, the second pilot check valve 45 and the third passage/pipe 43.

In the EHA system 1, waste heat from the electric motor 6 and the driver 61 is used in order to increase the operation oil temperature in the hydraulic circuit 4. Although not specifically shown in the figure, part of a passage/pipe of the hydraulic circuit 4 is connected to the electric motor 6 through a heat exchanger 62. As indicated by a white arrow illustrated in FIG. 1, heat released in association with the power supply to the electric motor 6 is transferred to operation oil through the heat exchanger 62. A configuration of the heat exchanger 62 may be employed, in which a heat transfer area between the electric motor 6 and operation oil is large. Although not specifically shown in the figure, a chassis of an electric circuit of the driver 61 is connected to the reservoir 46. As indicated by the white arrow illustrated in FIG. 1, heat released when the driver 61 is driven to supply power to the electric motor 6 is transferred to operation oil of the reservoir 46. Fins connected to the chassis may be arranged in the reservoir 46 to expand the heat transfer area. When electric power is supplied to the electric motor 6 through the driver 61, operation oil is heated by waste heat from the electric motor 6 and the driver 61.

Figure 3:
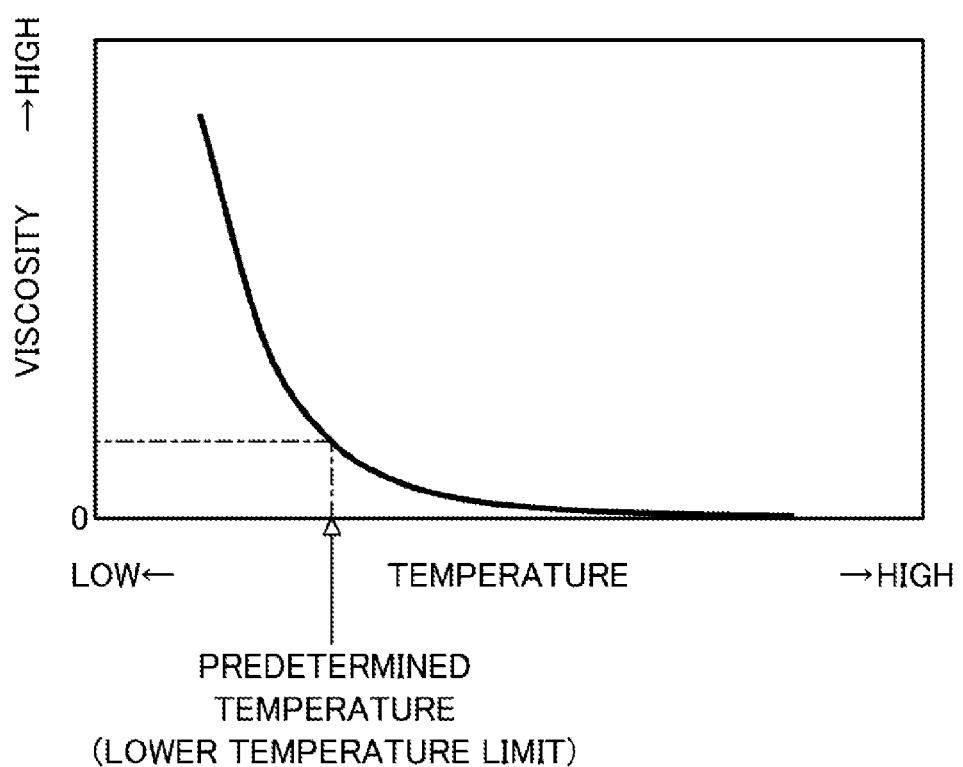
FIG. 3 is a graph illustrating an example of temperature properties relating to the viscosity of operation oil.

As exemplified in FIG. 3, the viscosity of operation oil used for the EHA system 1 is exponentially increased around a predetermined temperature (e.g., −40° C.). The increase in viscosity of operation oil results in an increase in pressure loss in each passage/pipe of the hydraulic circuit 4 and the hydraulic pump 5, and therefore there is a possibility that an adverse impact is provided on an operation of the hydraulic actuator 2 of EHA system 1. Operation oil is shrunk in association with a drop in operation oil temperature. This may also provide an adverse impact on the operation of the hydraulic actuator 2 of EHA system 1.

The landing gear retraction/extension device including the EHA system 1 is exposed to an extremely low temperature during flight at a high altitude, and, as a result, the operation oil temperature drops to equal to or lower than a predetermined temperature (e.g., about −54° C.). There is a possibility that, upon the landing of the aircraft, the operation of the EHA system 1 is unstable in the state in which the operation oil temperature is equal to or lower than the predetermined temperature.

In the landing gear retraction/extension device including the EHA system 1, waste heat from the electric motor 6 and the driver 61 is, before the landing of the aircraft, used to increase the operation oil temperature. Such a temperature increase control is specifically performed in accordance with a control logic flow illustrated in FIG. 2. That is, after the aircraft begins to prepare for landing Y minutes (predetermined time) before an estimated landing time (step S21), a landing preparing signal(s) is output from an aircraft system to the landing gear retraction/extension device (step S22). The landing gear retraction/extension device which confirmed input of the landing preparing signal(s) at step S23 obtains a measurement value of a temperature sensor 63 (see FIG. 1) attached to the reservoir 46, i.e., obtains a temperature $T_{FR}$ of operation oil (step S24), and then determines whether or not the temperature $T_{FR}$ of operation oil is higher than a predetermined temperature (step S25). The predetermined temperature may be, as necessary, set as a lower temperature limit at which the viscosity of operation oil is not so high and operation oil shrinkage is reduced, and may be specifically −40° C. as described above.

When the temperature $T_{FR}$ of operation oil is equal to or lower than the predetermined temperature ("NO" at step S25), the driver 61 supplies, at step S26, power to the electric motor 6 in order to increase the operation oil temperature. At this step, power may be supplied to the electric motor (three-phase motor) 6 with the same phase, thereby generating heat without rotation. Alternatively, power may be supplied to the electric motor 6 such that a torque of the electric motor 6 is equal to or less than the minimum drive torque of the hydraulic pump 5. In such cases, since the hydraulic pump 5 is not driven, operation oil does not flow in the hydraulic circuit 4. Unlike the foregoing, the driver 61 may supply, referring to FIG. 1, power to the electric motor 6 with the solenoid valve 411 being switched to the second state, thereby driving the hydraulic pump 5. In such a case, operation oil discharged from the hydraulic pump 5 through the first port 51 reaches, as indicated by solid arrows illustrated in FIG. 1, the reservoir 46 through the solenoid valve 411. Then, the operation oil discharged from the reservoir 46 returns to the second port 52 of the hydraulic pump 5 through the heat exchanger 62 of the electric motor 6. As described above, while operation oil circulates in the hydraulic circuit 4, the operation oil temperature is increased by waste heat from the electric motor 6 and the driver 61. An optimal operation upon the increase in operation oil temperature may be employed as necessary considering, e.g., efficiency of increasing the operation oil temperature, i.e., a relationship between the amount of consumption energy and the amount of operation oil temperature increase (or the rate of operation oil temperature increase). In such a case, the hydraulic circuit 4 is switchable between a circulation state of operation oil and a non-circulation state of operation oil in the middle of a temperature increase process.

Figure 2:
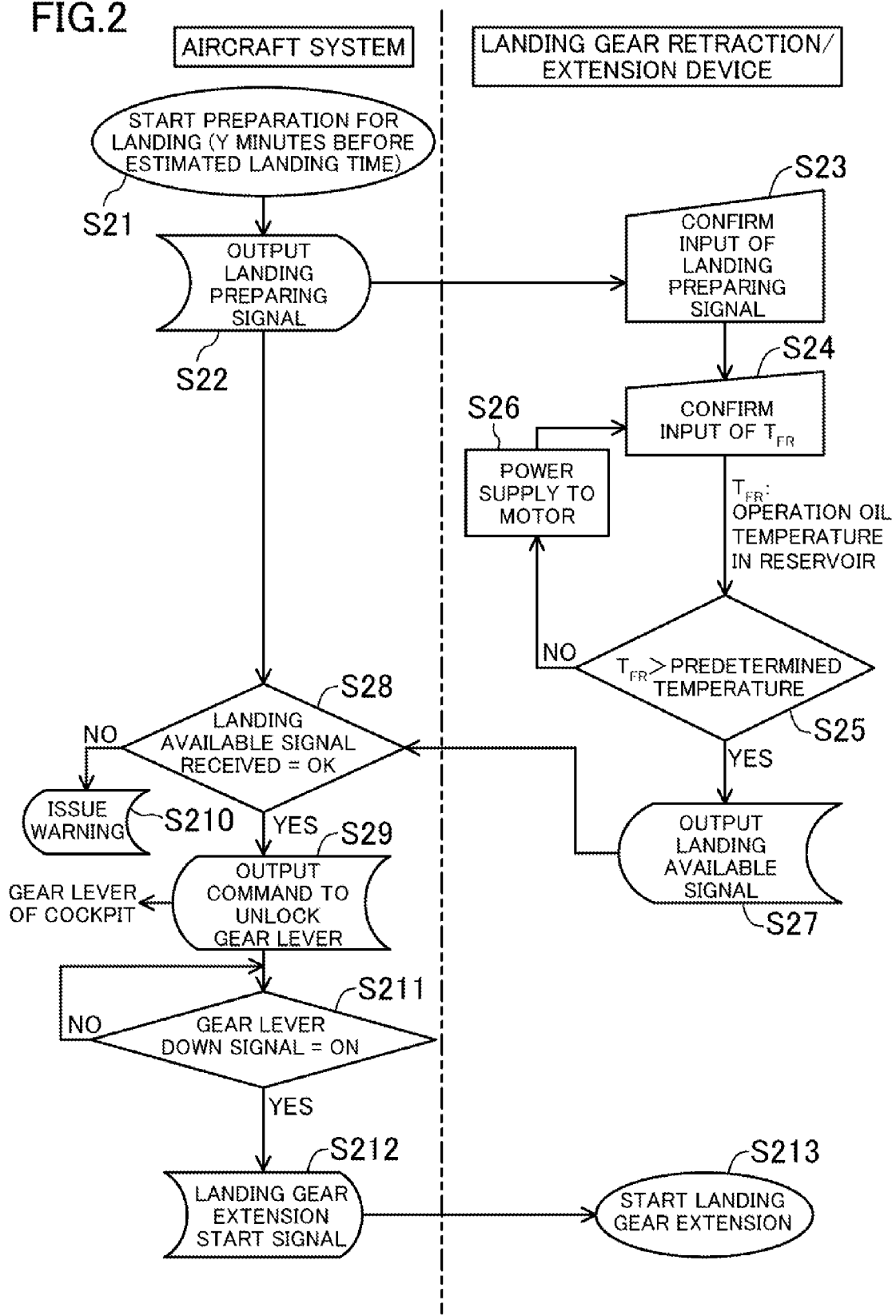
FIG. 2 is a flow chart illustrating a control logic of the landing gear retraction/extension device upon landing.

Referring back to the flow chart illustrated in FIG. 2, when the temperature $T_{FR}$ of operation oil exceeds the predetermined temperature at step S25 ("YES" at step S25), the EHA system 1 can be stably operated, and therefore the landing gear retraction/extension device outputs, at step S27, a landing available signal(s) to the aircraft system.

The aircraft system determines whether or not the aircraft system has received the landing available signal(s) from the landing gear retraction/extension device (step S28). When it is determined that the landing available signal(s) has received, the aircraft system outputs, at step S29, a command to unlock a gear lever for the extension of the landing gear in a cockpit to the gear lever. On the other hand, when it is determined at step S28 that the landing available signal(s) has not received from the landing gear retraction/extension device, warning is issued (step S210).

At step S211, the aircraft system determines whether or not a gear lever down signal(s) is turned on by a pilot's operation. When the gear lever down signal(s) is turned on, the aircraft system outputs, step S212, a landing gear extension start signal(s) to the landing gear retraction/extension device. The landing gear retraction/extension device which has received the landing gear extension start signal(s) begins to extend the landing gear (step S213).

On the assumption that, in an EHA system 1 of a landing gear retraction/extension device intended for a mid-size commercial aircraft, all losses of a driver 61 are caused as heat from the driver 61 and the heat is exchanged between operation oil and the driver 61, the present inventors calculated a time (i.e., the predetermined time) required for increasing an operation oil temperature from −54° C. which is a reachable temperature during flight to −40° C. (i.e., the lower temperature limit) at which the EHA system 1 can be stably operated. The required time was about 11 minutes. Note that it is assumed considering waste heat from the electric motor 6 that the required time is further shortened. Thus, the increase in operation oil temperature by using waste heat from the electric motor 6 and the driver 61 begins at least 10 minutes before the landing, thereby stably operating the EHA system 1 upon the landing.

In the EHA system 1, not only waste heat from the electric motor 6 but also waste heat from the driver 61 configured to supply power to the electric motor 6 are used to increase the operation oil temperature. Thus, it is ensured that the operation oil temperature can be promptly increased to a temperature higher than the predetermined temperature. Since the amount of energy required for increasing the operation oil temperature is reduced by using waste heat from both of the electric motor 6 and the driver 61, the use of waste heat is advantageous to improvement of fuel consumption of the aircraft. In addition, an additional device such as a heater is not required for increasing the operation oil temperature. This reduces the weight of the landing gear retraction/extension device.

Considering that the landing gear retraction/extension device is used only upon the takeoff and landing of the aircraft and is not used during the flight, the operation oil temperature is increased right before the landing of the aircraft. Thus, useless energy consumption due to, e.g., maintenance of the operation oil temperature at a temperature higher than the lower temperature limit during the flight of the aircraft is avoided, and the fuel consumption is improved. Consequently, reliability of the landing gear retraction/extension device is ensured.

Since the operation oil temperature is increased to the temperature higher than the lower temperature limit upon the operation of the EHA system 1, it is not necessary to employ the pressure type reservoir considering the increase in viscosity of operation oil or to increase the reservoir capacity considering the operation oil shrinkage. This is advantageous to the reduction in weight of the landing gear retraction/extension device.

The configuration relating to the heat transfer between each of the electric motor 6 and the driver 61 and operation oil can be used for cooling electric motor 6 and the driver 61 upon a normal state, i.e., when the operation oil temperature is higher than the lower temperature limit. Temperature reliability of the electric motor 6 and the driver 61 can be ensured.

The hydraulic circuit 4 illustrated in FIG. 1 has been set forth merely for the purpose of a preferred example in nature, and any circuit configuration can be employed for the circuit forming the EHA system 1 of the landing gear retraction/extension device.

In the foregoing configuration, waste heat from the electric motor 6 and the driver 61 is used to increase the operation oil temperature. However, e.g., waste heat from the hydraulic pump 5 may be further used to increase the operation oil temperature.

In the foregoing configuration, the control for increasing the operation oil temperature may be performed based on a measurement value of the temperature sensor 63 attached to the reservoir 46. However, instead of measuring a temperature, the control for increasing the operation oil temperature may be performed by, e.g., measuring a liquid level in the reservoir 46 and determining the degree of operation oil shrinkage based on such a measurement value.

What is claimed is:

1. A landing gear retraction/extension device for retracting/extending a landing gear of an aircraft, the landing gear retraction/extension device comprising:
   a hydraulic actuator;
   a hydraulic circuit which is capable of supplying operation oil to the hydraulic actuator to operate the hydraulic actuator;
   a hydraulic pump arranged on the hydraulic circuit and driven to supply operation oil to the hydraulic actuator;
   an electric motor configured to drive the hydraulic pump; and
   a driver configured to drive the electric motor,
   wherein:
      the hydraulic circuit is a closed circuit provided between the hydraulic actuator and the hydraulic pump,
      part of the hydraulic circuit is configured such that heat is exchangeable between operation oil and each of the electric motor and the driver, and
      the hydraulic circuit is configured such that no operation oil circulates when a temperature of operation oil is increased by waste heat from the electric motor and the driver.

2. The landing gear retraction/extension device of claim 1, wherein
   the driver supplies power to the electric motor right before landing of the aircraft such that the temperature of operation oil is higher than a predetermined temperature upon the landing of the aircraft upon which the hydraulic actuator is operated.

3. The landing gear retraction/extension device of claim 1, wherein when the temperature of operation oil is increased, the driver supplies power to the electric motor such that the electric motor is in a non-rotating state.

4. The landing gear retraction/extension device of claim 1, wherein when the temperature of operation oil is increased, the driver supplies power to the electric motor such that a torque of the electric motor is equal to or less than a minimum drive torque of the hydraulic pump.

5. A landing gear retraction/extension device for retracting/extending a landing gear of an aircraft, the landing gear retraction/extension device comprising:
   a hydraulic actuator;
   a hydraulic circuit which is capable of supplying operation oil to the hydraulic actuator to operate the hydraulic actuator;
   a hydraulic pump arranged on the hydraulic circuit and driven to supply operation oil to the hydraulic actuator;
   an electric motor configured to drive the hydraulic pump; and
   a driver configured to drive the electric motor,
      wherein:
         the hydraulic circuit is a closed circuit provided between the hydraulic actuator and the hydraulic pump,
         part of the hydraulic circuit is configured such that heat is exchangeable between operation oil and each of the electric motor and the driver, and
         the hydraulic circuit is configured to, when a temperature of operation oil by waste heat from the electric motor and the driver, circulate operation oil with the hydraulic actuator being bypassed.

* * * * *